United States Patent
Foussard et al.

(10) Patent No.: US 8,670,910 B2
(45) Date of Patent: Mar. 11, 2014

(54) METHOD FOR CONTROLLING A SPEED DIFFERENCE BETWEEN THE FRONT WHEELS AND REAR WHEELS OF A FOUR-WHEEL DRIVE VEHICLE

(75) Inventors: Francois Foussard, Rouen (FR); Alessandro Monti, La Garenne Colombes (FR); Richard Pothin, Jouars-Pontchartrain (FR); Nicolas Romani, Paris (FR); Philippe Saint-Loup, Jouars-Pontchartrain (FR)

(73) Assignee: Renault S.A.S., Guyancourt (FR)

( * ) Notice: Subject to any disclaimer, the term of this patent is extended or adjusted under 35 U.S.C. 154(b) by 0 days.

(21) Appl. No.: 13/202,450

(22) PCT Filed: Feb. 11, 2010

(86) PCT No.: PCT/FR2010/050238
§ 371 (c)(1), (2), (4) Date: Oct. 14, 2011

(87) PCT Pub. No.: WO2010/094877
PCT Pub. Date: Aug. 26, 2010

(65) Prior Publication Data
US 2012/0029780 A1   Feb. 2, 2012

(30) Foreign Application Priority Data
Feb. 20, 2009 (FR) .................................. 09 51101

(51) Int. Cl.
G06F 17/00 (2006.01)
B60T 7/12 (2006.01)
G08G 1/01 (2006.01)
B62D 5/06 (2006.01)

(52) U.S. Cl.
USPC ................ 701/69; 701/75; 340/936; 180/423

(58) Field of Classification Search
USPC ........... 701/67, 69, 68, 70, 75, 81, 82, 84, 89, 701/90, 93, 110, 121, 34.3, 518, 510, 509, 701/536, 479; 340/936, 453; 180/170, 230, 180/248, 69.3, 364, 423; 280/11.231, 280/12.13, 418, 99, 91.1, 165
See application file for complete search history.

(56) References Cited

U.S. PATENT DOCUMENTS 4,949,265 A * 8/1990 Eguchi et al. ................... 701/42
5,270,930 A * 12/1993 Ito et al. ......................... 701/69
(Continued)

FOREIGN PATENT DOCUMENTS

| | | |
|---|---|---|
| DE | 39 04 920 | 8/1989 |
| DE | 11 2006 001 862 | 5/2008 |
| EP | 1 403 124 | 3/2004 |

OTHER PUBLICATIONS
International Search Report Issued May 19, 2010 in PCT/FR10/050238 filed Feb. 11, 2010.

*Primary Examiner* — James Trammell
*Assistant Examiner* — Muhammad Shafi
(74) *Attorney, Agent, or Firm* — Oblon, Spivak, McClelland, Maier & Neustadt, L.L.P.

(57) ABSTRACT

A method for controlling a speed difference between speed of wheels of a front axle and speed of wheels of a rear axle of a four-wheel drive vehicle. The method: determines an initial speed difference set point based on the speed of the vehicle; determines one or more intermediate speed difference set points based on one or more operational parameters of the vehicle; modulates the initial speed difference set point based on the intermediate speed difference set points to obtain a final speed difference set point; measures the speed difference and compares the measured speed difference with the final speed difference set point; and controls the measured speed difference, so that the measured speed difference reaches the final speed difference set point.

8 Claims, 1 Drawing Sheet

(56) References Cited

U.S. PATENT DOCUMENTS

| | | |
|---|---|---|
| 5,461,568 A | 10/1995 | Morita |
| 5,752,211 A | 5/1998 | Takasaki et al. |
| 2001/0036228 A1* | 11/2001 | Skafidas et al. ............... 375/232 |
| 2004/0059494 A1 | 3/2004 | Yoneda |
| 2008/0147288 A1* | 6/2008 | Reiher et al. .................... 701/84 |
| 2009/0127014 A1* | 5/2009 | Ushiroda et al. .............. 180/249 |

* cited by examiner

METHOD FOR CONTROLLING A SPEED DIFFERENCE BETWEEN THE FRONT WHEELS AND REAR WHEELS OF A FOUR-WHEEL DRIVE VEHICLE

The present invention relates to a method for controlling a speed difference between front and rear wheels of a four-wheel drive motor vehicle. It also relates to a device making it possible to implement the method.

BACKGROUND

In the case of four-wheel drive motor vehicles, it is particularly beneficial to be able to servocontrol the speed of an axle of the vehicle with respect to the speed of the other axle. The desired mismatch between the speed of the wheels of the front axle and the speed of the wheels of the rear axle may be different depending on the running conditions of the vehicle.

For example, high accelerations may occur, for low speeds, when a traction-based engined vehicle is started, to such an extent that it is possible to favor a low slippage between the front wheels and the rear wheels in order to increase motivity. Conversely, for high speeds, a more sizable mismatch between the front axle and the rear axle will be tolerated in order to favor stability.

A method which improves the slippage during phases of quasi-static running by modifying the control of torque distribution between the front axle and the rear axle is known from document U.S. Pat. No. 5,752,211. This modification is carried out by reintroducing signals into the actuator regulating system.

However, on account of the modification of the regulating loop, the stability of the vehicle is not guaranteed with this type of method.

BRIEF SUMMARY

The objective of the present invention is to remedy these drawbacks.

The invention proposes a method for controlling a speed difference between the front axle and the rear axle of a four-wheel drive vehicle, the method making it possible to adjust the control while ensuring the stability of the vehicle.

The subject of the invention is thus a method for controlling a speed difference between the speed of the wheels of a front axle and the speed of the wheels of a rear axle of a four-wheel drive motor vehicle.

The method according to the invention comprises the following steps:
- determination of an initial speed difference setpoint as a function of the speed of the vehicle,
- determination of one or more intermediate speed difference setpoints as a function of one or more operating parameters of the vehicle,
- modulation of the initial speed difference setpoint as a function of said intermediate speed difference setpoints, so as to obtain a final speed difference setpoint,
- measurement of the speed difference and comparison of the measured speed difference with the final speed difference setpoint, and
- regulation of the measured speed difference, in such a way that the measured speed difference reaches the final speed difference setpoint value.

Thus, the speed difference setpoint is modulated upstream of the regulating system, thereby making it possible not to modify the regulating system.

The modulation of the initial speed difference setpoint ($C_{initial}$) may be carried out by successive modulations as a function of each intermediate speed difference setpoint.

The operating parameters of the vehicle can for example comprise one or more parameters chosen from among the clutch temperature, the turning radius and the difference in radius of the wheels between the front axle and the rear axle.

Other conceivable parameters may be the yaw rate, the state of the road, an ABS (Antiblockiersystem in German) regulating indicator, an ESP (Electronic Stability Program) regulating indicator, or else a position of the accelerator pedal.

The final speed difference setpoint is advantageously filtered before being compared with the measured speed difference.

The subject of the invention is also a device for controlling a speed difference between a front axle and a rear axle of a four-wheel drive motor vehicle.

The device according to the invention comprises:
- means for determining an initial speed difference setpoint as a function of the speed of the vehicle,
- means for determining one or more intermediate speed difference setpoints as a function of one or more operating parameters of the vehicle,
- means for modulating the initial speed difference setpoint as a function of said intermediate speed difference setpoints, allowing the obtaining of a final speed difference setpoint,
- means for measuring the speed difference and for comparing the measured speed difference with the final speed difference setpoint, and
- means for regulating the measured speed difference, allowing the measured speed difference to reach the final speed difference setpoint value.

The device can furthermore comprise means for filtering the final speed difference setpoint, as indicated hereinabove.

BRIEF DESCRIPTION OF THE DRAWINGS

Other aims, characteristics and advantages of the invention will become apparent on reading the following description, given solely by way of nonlimiting example and with reference to the appended drawings in which.

DETAILED DESCRIPTION

Figure 1:
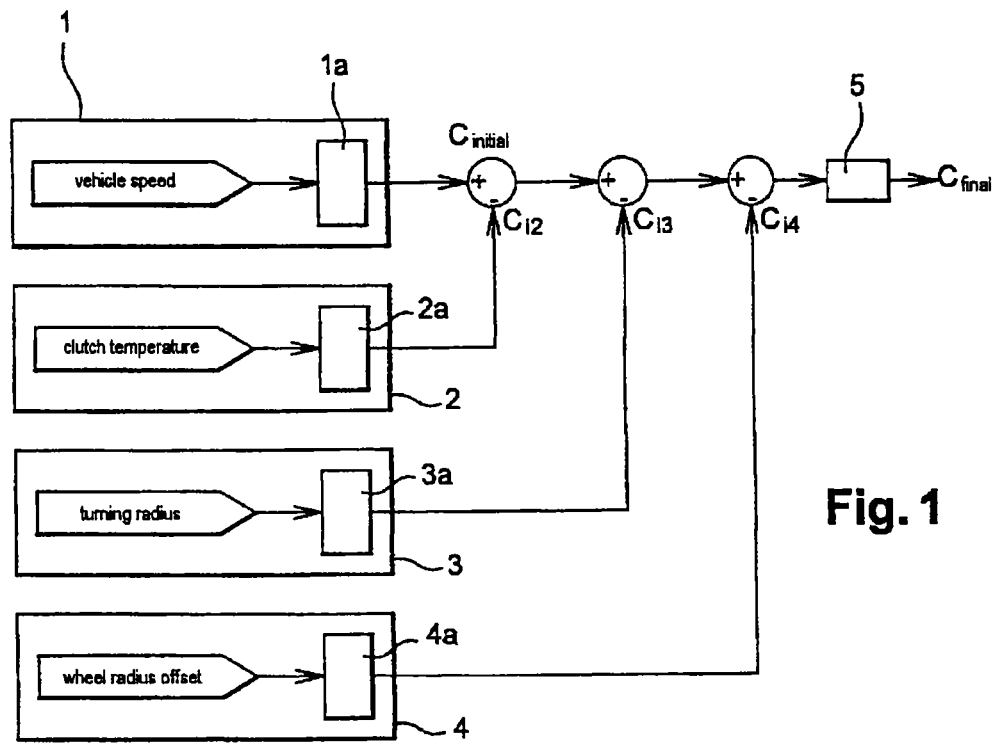
FIG. 1 schematically illustrates the determination of a speed difference setpoint, in accordance with a method according to the invention, and FIG. 2 schematically illustrates the regulating of the speed difference, in accordance with the method.
Figure 2:
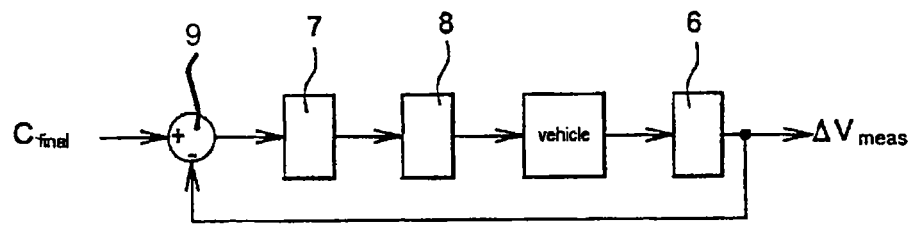

As illustrated in FIGS. 1 and 2, the manner of operation of the method may be described with reference to several blocks. A device for implementing the method can thus comprise an initial block 1, one or more intermediate blocks 2, 3, 4, a signal filtering block 5, a measurement block 6, a regulating block 7, and an actuator block 8.

The block 1, termed the initial block, makes it possible to determine an initial speed difference setpoint $C_{initial}$ between the speed of the wheels of a front axle and the speed of the wheels of a rear axle of a motor vehicle, as a function of the speed of the vehicle. The speed of the vehicle can for example be calculated on the basis of four speed sensors able to measure the speed of the four wheels of the vehicle. In the case of a mainly-traction vehicle, it is also possible to calculate the speed by taking the average of the speeds of the rear wheels.

The initial speed difference setpoint $C_{initial}$ may be obtained on the basis of a mapping 1a charting speed mismatch setpoint values as a function of the speed of the vehicle.

The intermediate blocks 2, 3, 4 allow the determination of intermediate speed difference setpoints which are each dependent on an operating parameter of the vehicle.

The intermediate block 2 allows the obtaining of an intermediate speed difference setpoint $c_{i2}$ as a function of the temperature of the operated clutch. The temperature of the clutch tends to increase when the axles are not at the same speed and when the clutch is transferring torque. The temperature of the clutch may be estimated on the basis of the torque demand and of the speed mismatch between the input and the output of the operated clutch.

The intermediate setpoint $c_{i2}$, which is dependent on the temperature of the clutch, may be obtained on the basis of a mapping 2a charting speed mismatch setpoint values as a function of the temperature of the clutch.

The initial speed difference setpoint $C_{initial}$ determined by the initial block 1 is then modulated as a function of the speed difference setpoint $c_{i2}$ dependent on the clutch temperature which has been determined by the intermediate block 2. Indeed, if the temperature of the clutch is high, a small speed difference will for example be permitted, since it is desired to avoid any spinning which could lead to a temperature rise which could damage the clutch.

The intermediate block 3 allows the obtaining of an intermediate speed difference setpoint $c_{i3}$ as a function of the turning radius. The intermediate setpoint $c_{i3}$, which is dependent on the turning radius, may be obtained on the basis of a mapping 3a charting speed mismatch setpoint values as a function of the turning radius.

The turning radius may be estimated with the aid of the following relations:

$$\dot{\psi} = \frac{V}{R} = \frac{Vrr}{Rrr} = \frac{Vrl}{Rrl}$$

$$Rrr = R + \frac{e}{2}$$

$$Rrl = R - \frac{e}{2}$$

Hence $$R = \frac{e}{2} \frac{(Vrr + Vrl)}{(Vrr - Vrl)}$$

where $\Psi$ is the yaw rate, V is the vehicle speed, Vrl is the rear left wheel speed, Vrr is the rear right wheel speed, R is the vehicle turning radius, Rrl is the turning radius of the rear left wheel, Rrr is the turning radius of the rear right wheel and e is the track.

The operating parameter of the vehicle used in the intermediate block 3 could also be the lateral acceleration, the yaw rate or the angle of the steering wheel. In this case, the intermediate setpoint which would be dependent on these parameters, could also be obtained on the basis of a mapping 3a charting speed mismatch setpoint values as a function of these parameters.

The speed difference setpoint, already modulated by the intermediate setpoint $c_{i2}$ of the intermediate block 2, is then modulated by the intermediate setpoint $c_{i3}$ of the intermediate block 3.

The intermediate block 4 allows the obtaining of an intermediate speed difference setpoint $c_{i4}$ as a function of the mismatches of radius of the wheels. The intermediate setpoint $c_{i4}$ dependent on the mismatches of radius of wheels may be obtained on the basis of a mapping 4a charting speed mismatch setpoint values as a function of mismatches in radius of wheels.

The speed difference setpoint, already modulated by the intermediate setpoints $c_{i2}$ and $c_{i3}$ of the intermediate blocks 2 and 3, is then modulated by the intermediate setpoint $c_{i4}$ of the intermediate block 4. If for example the tire of a front wheel is deflated, the radius of the wheel is smaller and its speed is therefore greater. By virtue of the intermediate block 4, it is possible to detect the smallest radius of the wheel, it is possible to modulate the speed difference setpoint by permitting a more sizable speed difference.

On completion of the modulation afforded by the intermediate block 4, a final speed difference setpoint $C_{final}$ is obtained. This setpoint $C_{final}$ has thus been obtained by successive modulations of the initial speed difference setpoint $C_{initial}$. The modulations can for example consist of successive subtractions of the intermediate values of speed difference setpoints from the value of speed difference setpoint. In the case of a traction-based engined vehicle, it will be possible to adjust the modulations so that the setpoint is always positive. Thus, if the difference between the unmodulated initial value of speed difference setpoint, modulated or unmodulated, and an intermediate setpoint value is negative, it will be possible to fix the value of speed difference setpoint at 0.

Conversely, in the case of a propulsion-based engined vehicle, it will be possible to adjust the modulations so that the setpoint is always negative.

The final speed difference setpoint $C_{final}$ can also be obtained, as illustrated in FIG. 1, after filtering by the filtering block 5 of the result obtained after modulation by the intermediate blocks 2, 3, 4. The aim of the filtering block 5 is to give a degree of additional freedom to the fine-tuning of the dynamics of the servocontrol without degrading its robustness. The passband of this filter can for example vary as a function of the driving situation. At low speed, it is possible to favor fast attainment of the torque so as to promote motivity, and at high speed, it is possible to favor a more progressive attainment for stability reasons.

The measurement block 6, as illustrated in FIG. 2, makes it possible to measure the speed difference between the speed of the wheels of the front axle and the speed of the wheels of the rear axle of the vehicle. The speed of the wheels of the front axle can for example be the average of the speeds of the front wheels of the vehicle, and the speed of the wheels of the rear axle can for example be the average of the speeds of the rear wheels of the vehicle.

The measured speed difference $\Delta V_{meas}$ is thereafter compared at comparator 9 with the final speed difference setpoint $C_{final}$. The mismatch between the observed variable $\Delta V_{meas}$ and the setpoint value $C_{final}$ is then corrected by the regulator block 7. The actuator block 8 will receive from the regulator block 7 a command which will be dependent on the measured value $\Delta V_{meas}$ and on the setpoint value $C_{final}$. The actuator block 8 will thus act on the vehicle so as to apportion the engine torque between the front axle and the rear axle in accordance with this command.

The method according to the invention thus makes it possible to modulate the speed mismatch setpoint as a function of various operating parameters of the vehicle. Intermediate blocks can easily be added or removed, thereby allowing great flexibility during design. Only the speed mismatch setpoint is altered, the regulating loop not being modified, thereby making it possible to guarantee the stability of the vehicle.

The invention claimed is:

1. A method for controlling a speed difference between a speed of wheels of a front axle and a speed of wheels of a rear axle of a four-wheel drive motor vehicle, the method comprising:

determining an initial speed difference setpoint as a function of speed of the vehicle;

determining a first intermediate speed difference setpoint as a function of a clutch temperature of a clutch of the vehicle;

determining a second intermediate speed difference setpoint as a function of a turning radius of the vehicle;

determining a third intermediate speed difference setpoint as a function of a difference in radius of the wheels between the front axle and the rear axle of the vehicle;

successively modulating the initial speed difference setpoint as a function of the first, second, and third intermediate speed difference setpoints, so as to obtain a final speed difference setpoint;

measuring the speed of wheels of the front axle and the speed of wheels of the rear axle to determine a measured speed difference between the wheels of the front axle and the wheels of the rear axle;

comparing the measured speed difference with the final speed difference setpoint to determine a mismatch between the measured speed difference with the final speed difference setpoint; and regulating the speed of wheels of the front axle with respect to the speed of wheels of the rear axle to correct the mismatch between the measured speed difference with the final speed difference setpoint such that the measured speed difference reaches the final speed difference setpoint value.

2. The method as claimed in claim 1, further comprising:

filtering the final speed difference setpoint before the comparing the measured speed difference with the final speed difference setpoint.

3. The method as claimed in claim 1, wherein the first intermediate speed difference is determined from a map charting speed mismatch setpoint values as a function of the clutch temperature.

4. The method as claimed in claim 1, wherein the second intermediate speed difference is determined from a map charting speed mismatch setpoint values as a function of the turning radius of the vehicle.

5. The method as claimed in claim 1, wherein the third intermediate speed difference is determined from a map charting speed mismatch setpoint values as a function of the difference in radius of the wheels between the front axle and the rear axle of the vehicle.

6. The method as claimed in claim 1, wherein the modulating includes successive subtractions of values of the first, second, and third intermediate speed difference setpoints from a value of the initial speed difference setpoint.

7. A device for controlling a speed difference between a front axle and a rear axle of a four-wheel drive motor vehicle, comprising:

sensors to measure a speed of each wheel of the front axle and a speed of each wheel of the rear axle;

a first block to determine an initial speed difference setpoint as a function of speed of the vehicle measured by the sensors;

a second block to determine a first intermediate speed difference setpoint based on a mapping in the second block and charting speed mismatch setpoint values as a function of a clutch temperature of a clutch of the vehicle;

a third block to determine a second intermediate speed difference setpoint based on a mapping in the third block and charting speed mismatch setpoint values as a function of a turning radius of the vehicle;

a fourth block to determine a third intermediate speed difference setpoint based on a mapping in the fourth block and charting speed mismatch setpoint values as a function of a difference in radius of the wheels between the front axle and the rear axle of the vehicle;

a comparator to successively modulate the initial speed difference setpoint as a function of the first, second, and third intermediate speed difference setpoints to obtain a final speed difference setpoint;

a measurement block including the sensors to measure the speed of wheels of the front axle and the speed of wheels of the rear axle to determine a measured speed difference between the wheels of the front axle and the wheels of the rear axle and to compare the measured speed difference with the final speed difference setpoint to determine a mismatch between the measured speed difference with the final speed difference setpoint; and a regulating block to regulate the speed of wheels of the front axle with respect to the speed of wheels of the rear axle to correct the mismatch between the measured speed difference with the final speed difference setpoint such that the measured speed difference reaches the final speed difference setpoint value.

8. The device as claimed in claim 7, further comprising a filtering block to filter the final speed difference setpoint.

* * * * *